D. SHAW.
Smut Mill and Grain Separator.
No. 3,794. Reissued Jan'y 11, 1870.
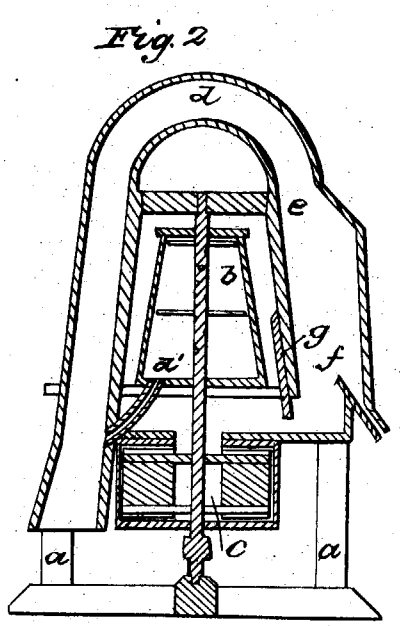
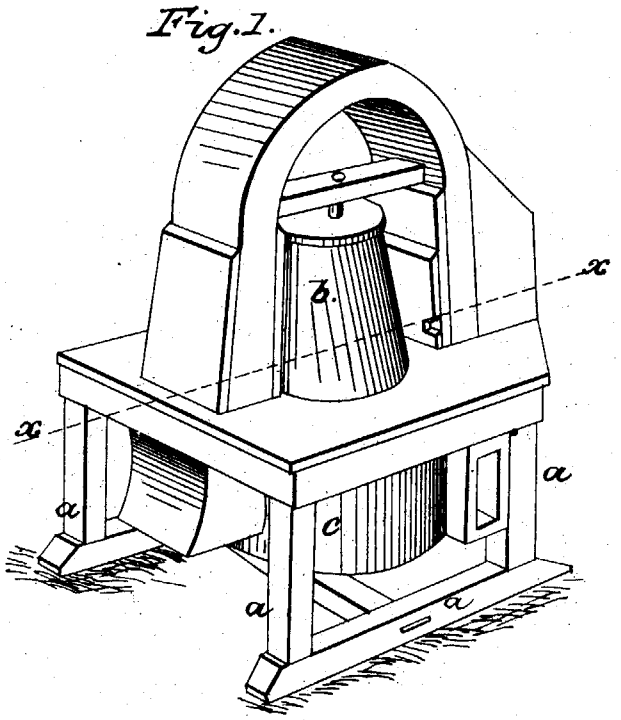
N. PETERS. Photo-Lithographer, Washington, D. C.

United States Patent Office.

DANIEL SHAW, OF ELKHART, INDIANA.

*Letters Patent No.* 8,861, *dated April* 6, 1852; *reissue No.* 1,564, *dated November* 3, 1863; *extended seven years; reissue No.* 3,794, *dated January* 11, 1870.

IMPROVED SMUT-MILL AND GRAIN-SEPARATOR.

The Schedule referred to in these Letters Patent and making part of the same

*To all whom it may concern:*

Be it known that I, DANIEL SHAW, formerly of Cheshire, in the State of Ohio, more recently of Chicago, in the county of Cook, and State of Illinois, but now residing in Elkhart, in the county of Elkhart, and State of Indiana, have invented certain new and useful Improvements in Smut-Mills and Grain-Separators; and that the following is a full, clear, and exact description of the same, reference being had to the accompanying drawings, making a part of this specification, in which—

Figure 1 represents, in perspective, an external view of the combined smut-mill and grain-separator; and Figure 2 represents a vertical section through the same.

Previous to my invention, the smutting and scouring of grain were done in one machine, and the separating of the grain into qualities, according to its specific gravity, and further separating of grain from the screenings or lighter impurities, and from the dust, chaff, &c., were done in another machine, thus requiring two machines, two handlings, and two operations.

I lay no claim to any such separated machines or operations. Nor do I claim any machine where a separation is attempted through the smutting-cylinder, or wherein less than three distinct and separate divisions of the material, according to their values and specific gravities, are made, and separately deposited in separate places.

The object and purpose of my invention are to so devise, as, that by one machine, one handling of the grain, and one operation, the grain shall be divested of the smut, or scoured, separated into qualities of heavy and lighter grain, and separated from the dust, chaff, and light impurities, by once passing through such machine; and, secondly, my object and purpose are to so construct such a machine, as that it would be simple in its construction, not liable to get out of order, efficient in its operation, and, from its cheapness of construction, within the reach of any one; and My invention consists, first, in the combination of a smutter or scourer, with a suction separating fan-blast or current of air, so that a separation of the dust, chaff, and other impurities from the grain, shall take place after the grain has been scoured, and after leaving the scouring-cylinder.

My invention further consists, in combination with a smutter or scourer and a separating suction-blast, the separating and depositing in separate places, of, first, the heavy or very clean wheat; second, the lighter grains or screenings; and third, the smut, dust, and chaff.

My invention further consists, in combination with a smutter or scourer and a suction separating-fan, the placing and driving of both the smutting-cylinder and the fan on one and the same vertical shaft, so as to be both driven from the same belt or first moving-power.

My invention further consists in the combination of a smutter or scourer and a suction-fan, both arranged on and driven by the same vertical shaft, and an air-trunk for directing the course of the blast, a regulator for changing the force of the current of air, without necessarily changing the speed of the smutting or scouring-cylinder.

My invention further consists in the combination of a smutter or scourer and a suction separating-fan, with a wind or air-trunk, common to both the smutter and the fan-blast, and so that the contents of the smutter may pass into the column of air that rushes through the trunk to the fan, and be separated therein.

My invention further consists in the arranging of the smutter or scourer and the suction separating-fan, within or between the legs of the blast or air-trunk, which passes over or around them, for economizing space and cheapening the construction of the machine.

To enable others skilled in the art to make and use my invention, I will proceed to describe the same, with reference to the drawings.

*a a*, &c., represent a main frame for containing and supporting the entire machine.

Upon this main frame is supported a vertical shaft, which may be driven by a belt from any first moving-power, and upon the lower end of this shaft is arranged a fan, *c*, and upon the upper end thereof a smutting or scouring-cylinder, *b*, both the fan and the smutting-cylinder being arranged within suitable cases, that have proper inlet and exit-openings, as will be explained.

Over the smutter and fan-cases passes an inverted bow or U-shaped wind-trunk, *d*, which is common to the smutter, by the pipe or passage *d'*, and to the fan, by or through a passage underneath the smutter-case, that leads into the eye of the fan.

A sliding regulator, *g*, commands the passage leading from the wind-trunk to the eye of the fan, so that without interfering with the speed of the smutter-cylinder or the fan, the force of the blast or current of air through the wind-trunk to the fan may be regulated.

Within the wind-trunk is arranged a screen, *e*, where a separation of the lighter grains or impurities may be made from the smut, dirt, chaff, &c., said lighter grains dropping from the edge of the screen into the opening at *f*, and thence passing out of the machine, while the smut, dirt, and chaff are drawn into and through the fan, and driven out through the trunk (fig. 1) leading from the fan-case, out of the building, if necessary.

The heavy wheat, or that which is fully cleaned and divested of all its impurities, when, or the instant after, it is passed from the smutter through the passage into the wind-trunk, falls out of the open end of said trunk, while all the remaining particles of light grain, chaff, short straw, smut, dirt, &c., are taken by the ascending current of air, and carried up and over to where the succeeding separation takes place, as above mentioned.

The grain with all the impurities mixed with it, as it comes from the thresher, or in a partially-screened state, is thrown into the smutter, through an opening in its top, where the smut-balls are broken or loosened, and the grain scoured by attrition, and by the beater-arms throwing it against the enclosing-case or shell. No separation takes place in the smutter, as there is no operative-blast within the outer case. The whole contents of the smutter, including the dirt shovelled in with the grain, and everything loosened from the grain, pass from the smutter or scourer into the wind-trunk, and the moment they enter the wind-trunk, then the separating begins; the heavy wheat, by its specific gravity, dropping down and out of the wind-trunk, while all the lighter particles are carried up and over to the final separation.

There are three different places of deposit for the three different things separated from each other, viz, the heavy, plump, cleaned wheat, at the end of the wind-trunk, where the air enters; the lighter grains and particles are carried out through *f;* and the dirt, smut, and chaff are drawn through the fan, and out through the trunk or passage leading therefrom, and out of the building, if necessary.

Having thus fully described my invention, and shown how it is operated,

What I claim therein as new, and desire to secure by Letters Patent, is—

1. The combination of a smutter or scourer, with an independent suction separating fan-blast or current of air, so that the separation of the dust, chaff, and other impurities from the grain, shall take place after the grain has been scoured, and after leaving the scouring-cylinder, and the dust separated from the lighter impurities, and deposited apart from the chaff and other impurities, and independent of any action of the smutter, substantially as described.

2. In combination with a smutter or scourer and a separating suction-blast, the separating and depositing in separate places of, first, the heavy or very clean wheat; second, the lighter grains or screenings, freed from dust; and third, the smut, dust, and chaff, substantially as described.

3. In combination with a smutter or scourer and a suction-fan, both arranged on and driven by the same shaft, and an air-trunk for directing the course of the blast, a regulator for changing the force or volume of the current of air, without changing the speed or motion of the smutting or scouring-cylinder, substantially as described.

4. The combination of a smutter or scourer and a suction separating-fan, with a wind or air-trunk, common to both the smutter and the fan-blast, and so that the contents of the smutter may pass into the column of air that rushes through the trunk to the fan, and the entire separation take place therein by the action of the fan-blast alone, after leaving the scourer, substantially as described.

5. The arranging of the smutter or scourer and the suction separating-fan within or between the legs of the blast or air-trunk in which the entire separation is made, and which passes over or around them, for the purpose of economizing space and cheapening the construction of the machine, substantially as described.

DANIEL SHAW.

Witnesses:
B. TURNOCK,
R. B. STUART.